United States Patent
Zhang

(10) Patent No.: US 10,296,771 B2
(45) Date of Patent: May 21, 2019

(54) FINGERPRINT RECOGNITION SYSTEM AND METHOD

(71) Applicant: SHENZHEN GOODIX TECHNOLOGY CO., LTD., Guangdong (CN)

(72) Inventor: Junjun Zhang, Guangdong (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 218 days.

(21) Appl. No.: 15/479,336

(22) Filed: Apr. 5, 2017

(65) Prior Publication Data

US 2017/0262690 A1    Sep. 14, 2017

Related U.S. Application Data

(63) Continuation of application No. PCT/CN2016/071064, filed on Jan. 15, 2016.

(30) Foreign Application Priority Data

Mar. 27, 2015    (CN) .......................... 2015 1 0139829

(51) Int. Cl.
*G06K 9/20* (2006.01)
*G06K 9/00* (2006.01)
*G06F 1/32* (2019.01)

(52) U.S. Cl.
CPC ....... *G06K 9/00013* (2013.01); *G06K 9/0002* (2013.01); *G06F 1/32* (2013.01)

(58) Field of Classification Search
CPC ......... G06K 9/00006–9/0012; G06K 9/00107; G06K 9/0002; G06F 3/044
See application file for complete search history.

(56) References Cited

U.S. PATENT DOCUMENTS

| 5,325,442 A * | 6/1994 | Knapp ................... G01B 7/004 |
| | | 361/278 |
| 2009/0009195 A1* | 1/2009 | Seguine ................... G01D 5/24 |
| | | 324/690 |

(Continued)

FOREIGN PATENT DOCUMENTS

| CN | 102750520 A | 10/2012 |
| CN | 103745194 A | 4/2014 |

(Continued)

OTHER PUBLICATIONS

Extended Search Report issued in corresponding European patent application No. 16771160.5 dated Jan. 10, 2018.

(Continued)

*Primary Examiner* — Brian Werner
(74) *Attorney, Agent, or Firm* — Heslin Rothenberg Farley & Mesiti P.C.

(57) ABSTRACT

A fingerprint recognition system and method are disclosed. The fingerprint recognition system includes: a fingerprint recognition apparatus, a detection electrode, and a contact detection apparatus. The contact detection apparatus includes: an analog to digital converter configured to charge and discharge the detection electrode and to detect a capacitance value of the detection electrode; a determining module configured to determine whether the detection electrode is touched by a finger according to the capacitance value, and to generate finger touch information when determining that the finger touches the detection electrode to start the fingerprint recognition apparatus to perform fingerprint recognition.

12 Claims, 5 Drawing Sheets

(56) References Cited

U.S. PATENT DOCUMENTS

2013/0033451 A1* 2/2013 Olson .................. G06F 3/044
            345/174
2015/0071511 A1   3/2015 Wang

FOREIGN PATENT DOCUMENTS

| CN | 203746088 U    | 7/2014  |
|----|----------------|---------|
| CN | 203909813 U    | 10/2014 |
| CN | 104318222 A    | 1/2015  |
| CN | 104751106 A    | 7/2015  |
| CN | 104794433 A    | 7/2015  |
| DE | 102013206395 A1| 10/2013 |
| JP | 20102622460 A  | 11/2010 |
| WO | 01/82237 A3    | 11/2001 |

OTHER PUBLICATIONS

Perme, Thomas et al., Capacitive Touch Using Only an ADC ("CVD"), MicrochipTechnology, Inc., AN1298, 2009, 4 pages.
International Search Report issued in PCT/CN2015/071064, dated Apr. 26, 2016.

\* cited by examiner

Fig. 4A - The finger does not contact the metal ring:

Fig. 4B - Performance 1 when the finger touches the metal ring:

Fig. 4C - Performance 2 when the finger touches the metal ring:

Fig. 4D - Performance 3 when the finger touches the metal ring:

Fig. 4E - Performance 4 when the finger touches the metal ring:

FINGERPRINT RECOGNITION SYSTEM AND METHOD

CROSS-REFERENCE TO RELATED APPLICATIONS

The present application is a continuation application of PCT application No. PCT/CN2016/071064 submitted on Jan. 15, 2016 which is based upon and claims priority to Chinese Patent Application No. 201510139829.4, filed by Shenzhen Huiding Technology Co., Ltd. on Mar. 27, 2015 and entitled "FINGERPRINT RECOGNITION SYSTEM AND METHOD", both of which are incorporated herein by reference in their entireties.

TECHNICAL FIELD

The present disclosure relates to the field of fingerprint detection technologies, and in particular, to a fingerprint recognition system and method.

BACKGROUND

Currently, capacitive sensing fingerprint recognition apparatuses have already been used in a new generation of portable electronic devices. A fingerprint recognition apparatus scans a user's fingerprint and extracts features of the scanned fingerprint, and performs encrypted transmission of the fingerprint information, then compares the obtained fingerprint information with pre-stored fingerprint information, so as to complete authentication of the user's fingerprint.

However, the fingerprint recognition apparatus needs to scan relatively large finger area when performing fingerprint scanning each time, and can obtain fingerprint information with sufficient accuracy only when fingerprint scanning is carried out in a condition that a pixel density is greater than 500 dpi (dots per inch). Therefore, a signal processing module such as a low noise amplifier or an analog to digital converter, and a central processor are needed to obtain the fingerprint information. This leads to relatively high power consumption of the fingerprint recognition apparatus when performing fingerprint recognition.

SUMMARY

The present disclosure tackles at least one technical problem in related technologies to some extent.

Therefore, a first objective of the present disclosure is to provide a fingerprint recognition system. The fingerprint recognition system keeps most of function modules of a fingerprint recognition apparatus in a dormant state when not detecting that a finger touches the fingerprint recognition apparatus, and starts the fingerprint recognition apparatus to perform fingerprint recognition when detecting that the finger touches the fingerprint recognition apparatus, so as to reliably and effectively recognize a user fingerprint and while greatly reduces power consumption of the fingerprint recognition apparatus.

A second objective of the present disclosure is to provide a fingerprint recognition method.

A third objective of the present disclosure is to provide a device.

A fourth objective of the present disclosure is to provide a computer storage medium.

To achieve the foregoing objectives, an embodiment of a first aspect of the present disclosure provides a fingerprint recognition system, including: a fingerprint recognition apparatus, a detection electrode, and a contact detection apparatus where the contact detection apparatus comprising: an analog to digital converter, charges and discharges the detection electrode, and detecting capacitance value of the detection electrode; a determining module, determines whether a finger touches the detection electrode; When determining that the finger touches the detection electrode, the contact detection apparatus generates finger touching information, in order to activate the fingerprint recognition apparatus to perform fingerprint recognition.

The fingerprint recognition system provided in this embodiment of the present disclosure determines whether a finger touches the fingerprint recognition apparatus according to a change of the capacitance value of the detection electrode, keeps most of function modules of the fingerprint recognition apparatus in a dormant state when not detecting that the finger touches the fingerprint recognition apparatus, and activates the fingerprint recognition apparatus to perform fingerprint recognition when detecting that the finger touches the fingerprint recognition apparatus, so as to reliably and effectively recognize a user fingerprint while greatly reduce power consumption of the fingerprint recognition apparatus.

To achieve the foregoing objectives, an embodiment of a second aspect of the present disclosure provides a fingerprint recognition method, including: charging and discharging the detection electrode by the contact detection apparatus, and detecting a capacitance value of the detection electrode; determining by the contact detection apparatus, whether a finger touches the detection electrode according to the capacitance value; and when determining that the finger touches the detection electrode, generating, by the contact detection apparatus, finger touch information, so as to start a fingerprint recognition apparatus to perform fingerprint recognition.

The fingerprint recognition method provided in this embodiment of the present disclosure including: determining whether a finger touches the fingerprint recognition apparatus according to the change of the capacitance value of the detection electrode; keeping most of function modules of the fingerprint recognition apparatus in a dormant state when not detecting that the finger touches the fingerprint recognition apparatus; and activating the fingerprint recognition apparatus to perform fingerprint recognition when detecting that the finger touches the fingerprint recognition apparatus, so as to reliably and effectively recognize a user fingerprint and while greatly reduce power consumption of the fingerprint recognition apparatus.

Additional aspects and advantages of the present disclosure will partly be presented in the following description, and a part of them will become obvious in the following description or be understood by the claimed disclosure.

To achieve the foregoing objectives, an embodiment of a third aspect of the present disclosure provides a device, including: one or more processors; a memory; and one or more programs, where the one or more programs are stored in the memory, and when the one or more programs are executed by the one or more processors, the fingerprint recognition method according to the embodiment of the second aspect is performed.

The device provided in this embodiment of the present disclosure determines whether a finger touches the fingerprint recognition apparatus according to the change of the capacitance value of the detection electrode, keeps most of function modules of the fingerprint recognition apparatus in a dormant state when not detecting that the finger touches the fingerprint recognition apparatus, and activates the fingerprint recognition apparatus to perform fingerprint recognition when detecting that the finger touches the fingerprint recognition apparatus, so as to reliably and effectively recognize a user fingerprint and while greatly reduce power consumption of the fingerprint recognition apparatus.

To achieve the foregoing objectives, an embodiment of a fourth aspect of the present disclosure provides a non-volatile computer storage medium, where one or more programs are stored in the computer storage medium, and when the one or more programs are executed by a device, the device is enabled to perform the fingerprint recognition method according to the embodiment of the second aspect of the present disclosure.

The computer storage medium provided in this embodiment of the present disclosure determines whether a finger touches the fingerprint recognition apparatus according to the change of the capacitance value of the detection electrode, keeps most of function modules of the fingerprint recognition apparatus in a dormant state when not detecting that the finger touches the fingerprint recognition apparatus, and starts the fingerprint recognition apparatus to perform fingerprint recognition when detecting that the finger touches the fingerprint recognition apparatus, so as to reliably and effectively recognize a user fingerprint and while greatly reduce power consumption of the fingerprint recognition apparatus.

BRIEF DESCRIPTION OF THE DRAWINGS

The foregoing and/or additional aspects and advantages of the present disclosure will become apparent and easily comprehensible from description of the embodiments in conjunction with accompanying figures, in which.

DETAILED DESCRIPTION

The following describes the embodiments of the present disclosure in details, examples of the embodiments are shown in the figures, where same or similar reference signs throughout the description represent same or similar elements or elements having same or similar functions. The following embodiments while describing the disclosure with figures are exemplary, are given by way of explaining the present disclosure, and not by way of limitation.

In addition, the terms "first" and "second" are only used for the purpose of description, but cannot be construed as indication or implication of importance, or implicit indication of quantities of technical features. Therefore, features limited by the "first" and the "second" may expressly or impliedly indicate that one or more of the features are included. In description of the present disclosure, the meaning of "multiple" means two or more, unless it is expressly and specifically defined.

Any process or method description in a flowchart or that is described in another manner may be constructed as including one or more modules, snippets or parts of codes of executable instructions that are used for implementing a step having a specific logic function or process, and the scope of optimized implementation manners of the present disclosure include another implementation, where the function may be performed not following the shown or discussed sequence, including a manner in which involved functions are performed nearly simultaneously or in a reverse sequence. This should be understood by those skilled in the art of the embodiments of the present disclosure.

The following describes a fingerprint recognition system and method according to the embodiments in conjunction with accompanying figures.

Figure 1:
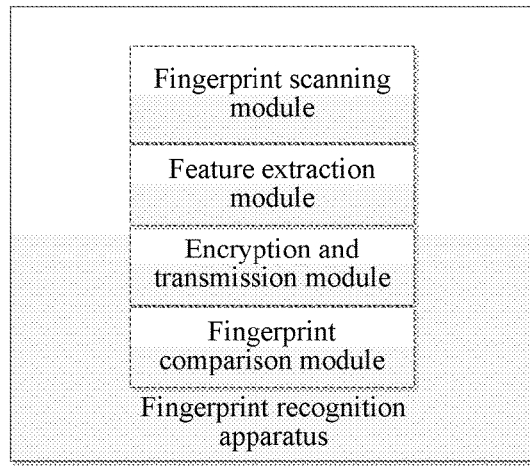
FIG. 1 is a schematic structural diagram of a fingerprint recognition apparatus in the prior art.

As shown in FIG. 1, a typical fingerprint recognition apparatus generally includes a fingerprint scanning module, a feature extraction module, an encryption and transmission module, and a fingerprint comparison module. The fingerprint scanning module scans a fingerprint of a user. The feature extraction module performs feature extraction on the scanned fingerprint to obtain fingerprint information of the user. The encryption and transmission module is used for encrypting and transmitting the fingerprint information that is obtained by the feature extraction. The fingerprint comparison module compares the obtained fingerprint information with pre-stored fingerprint information, so as to complete recognition of the user fingerprint. In an embodiment of the present disclosure, a detection electrode and a contact detection apparatus are added to the fingerprint recognition apparatus, to detect whether a user's finger touches the fingerprint recognition apparatus. The fingerprint recognition apparatus is activated to perform fingerprint recognition upon detecting that a finger of the user touches the fingerprint recognition apparatus, and this can reliably and effectively distinguish a user's finger touch on the fingerprint recognition apparatus from touch of other objects. Consequently, an unnecessary activation of overall the fingerprint recognition apparatus can be avoided, thereby reducing an overall standby power consumption of the fingerprint recognition apparatus.

The fingerprint recognition apparatus in this embodiment of the present disclosure may adopt the above-described fingerprint recognition apparatus. To avoid redundancy, the details are not described herein again.

Figure 2:
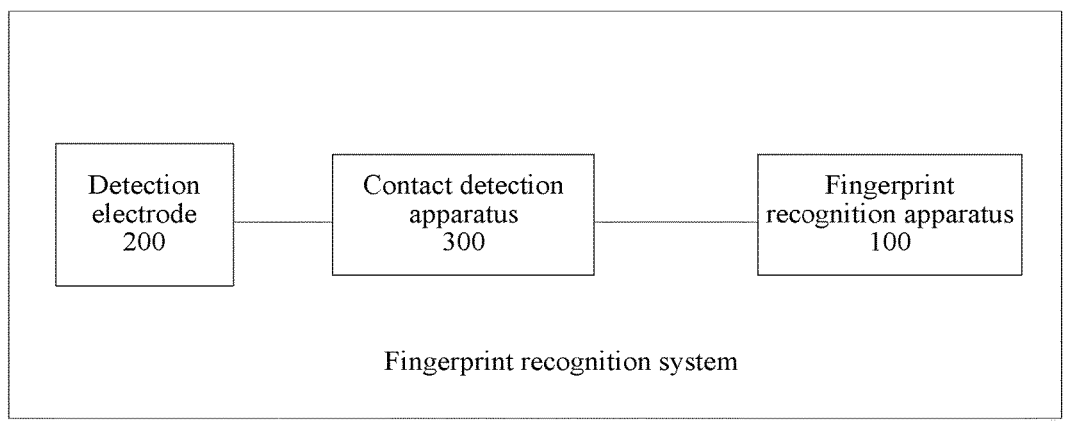
FIG. 2 is a schematic structural diagram of a fingerprint recognition system according to an embodiment of the present disclosure.

FIG. 2 is a schematic structural diagram of a fingerprint recognition system according to an embodiment of the present disclosure. The fingerprint recognition system includes a fingerprint recognition apparatus 100, a detection electrode 200, and a contact detection apparatus 300.

Multiple optional arrangements of the detection electrode 200 may be applied in the fingerprint recognition system. The detection electrode 200 may be an independent electrode from the fingerprint recognition apparatus 100, and is separately disposed from the fingerprint recognition apparatus 100; alternatively, an electrode of the fingerprint recognition apparatus 100 may be used for the detection electrode 200.

In an embodiment of the present disclosure, the detection electrode 200 may be a metal ring that is arranged on a surface of the fingerprint recognition apparatus 100, and the metal ring is shared with the fingerprint recognition apparatus 100 to carry a drive signal of the fingerprint recognition apparatus 100. In other words, a metal ring for carrying the drive signal during fingerprint recognition of the fingerprint recognition apparatus 100 can also be used as the detection electrode 200, so as to save the assembly and production cost of the fingerprint recognition system. A shape of the metal ring may include, but is not limited to, a rectangle, a square, or a circle. It should be understood that, using the metal ring as the detection electrode 200 is merely exemplary in the present disclosure, and the material and the shape of the detection electrode 200 is not limited by the above description. The detection electrode 200 may be formed by other materials and in other shapes.

The detection electrode 200 may be a metal layer that is disposed on a surface of the contact detection apparatus 300, or may be a detection film which is disposed on the contact detection apparatus 300 and under a covering object. That is, the contact detection apparatus 300 may be a chip integrated in the fingerprint recognition system; the detection electrode 200 may be a metal layer that is integrated on the surface of the chip which is used as the contact detection apparatus 300, and forms an overlap area when a user's finger touches the fingerprint recognition apparatus, so that the user's finger may directly contact the detection electrode 200. Alternatively, the detection electrode 200 may be a detection film that is disposed under the covering object such as a glass panel and isolated from the user's finger by the covering object during the fingerprint recognition, so that the user's finger may also be coupled to the detection electrode 200 indirectly even if the finger is isolated from the detection electrode 200 by the covering object.

The following describes the fingerprint recognition system in this embodiment of the present disclosure in details with the description of the detection electrode 200 being a common electrode shared with the fingerprint recognition apparatus.

The detection electrode 200 can be used an input end to detect whether the user's finger touches the fingerprint recognition apparatus 100. When the user's finger touches or approaches the detection electrode 200, a capacitance value of the detection electrode 200 with respect to a system ground of the contact detection apparatus 300 changes. Therefore, in the present disclosure, whether the user's finger touches the detection electrode 200 may be determined based on a change of the capacitance value of the detection electrode 200 with respect to the system ground.

When the contact detection apparatus 300 does not detect that the detection electrode 200 is touched by the finger, most function modules in the fingerprint recognition apparatus 100 are kept in a sleep state. For example, a fingerprint scanning module, a feature extraction module, an encryption and transmission module, and the like are maintained the sleep state with low power consumption. When the contact detection apparatus 300 detects a distinct change of the capacitance value of the detection electrode 200 with respect to the system ground, that is, a distinct change of an external capacitance value, each function module of the fingerprint recognition apparatus is controlled to start to perform collection and comparison of a user fingerprint. Therefore, the fingerprint recognition apparatus 100 can not only reliably recognize the user fingerprint, but also reduce power consumption greatly.

Figure 3:
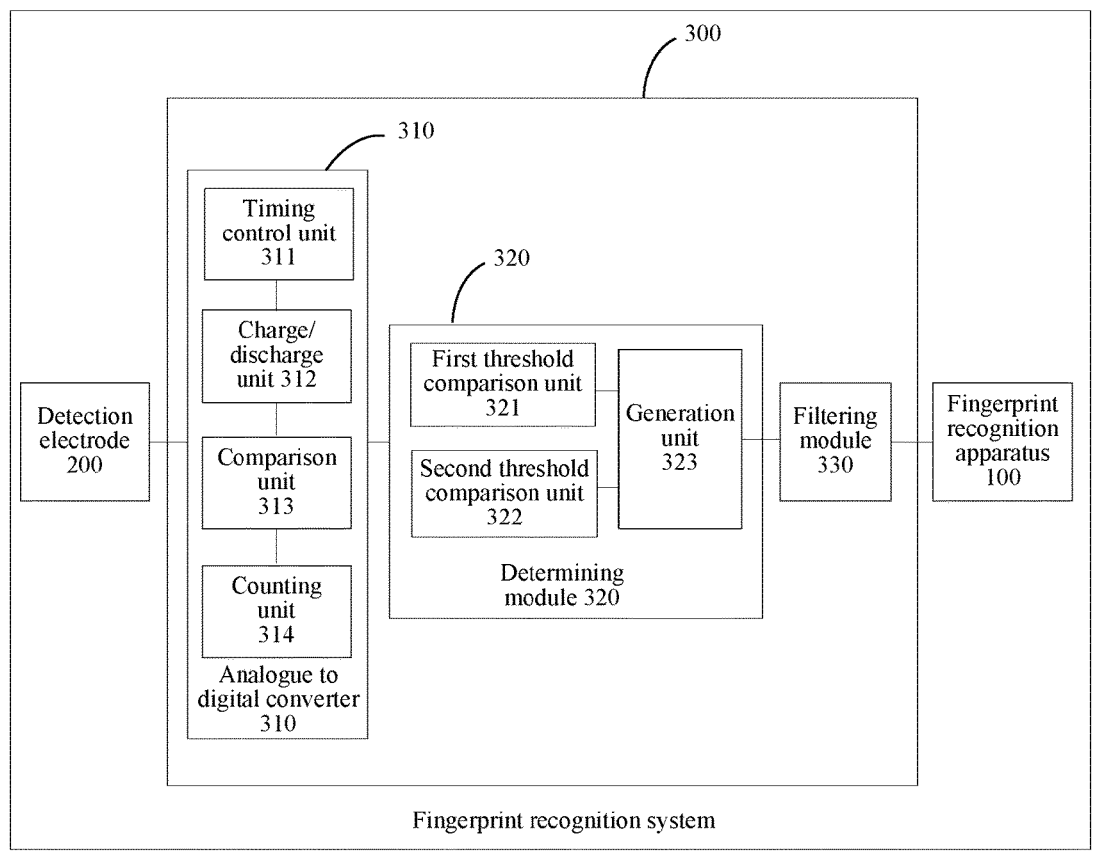
FIG. 3 is a schematic structural diagram of a fingerprint recognition system according to a specific embodiment of the present disclosure.

FIG. 3 is a schematic structural diagram of a fingerprint recognition system according to a specific embodiment of the present disclosure.

In this embodiment of the present disclosure, a contact detection apparatus 300 specifically includes an analog to digital converter 310, a determining module 320, and a filtering module 330.

The analog to digital converter 310 includes a timing control unit 311, a charging/discharging unit 312, a comparison unit 313, and a counting unit 314; the analog to digital converter 310 is configured to charge and discharge a detection electrode 200, and detect a capacitance value of the detection electrode 200.

The determining module 320 includes a first threshold comparison unit 321, a second threshold comparison unit 322, and a generation unit 323; the determining module 320 is configured to determine whether the detection electrode 200 is touched by a finger according to the capacitance value of the detection electrode 200, and generate finger touch information when determining that the detection electrode 200 is touched by the finger, so as to activate the fingerprint recognition apparatus 100 to perform fingerprint recognition.

Specifically, in the present disclosure, the detection electrode 200 is charged and discharged with a constant current to detect whether a user's finger touches the detection electrode 200. When the user's finger does not touch the detection electrode 200, a capacitance value $C\_{ring}$ between the detection electrode 200 and a system ground of the contact detection apparatus 300 exists; the capacitance value $C\_{ring}$ between the detection electrode 200 and the system ground is generally relevant to materials and structures of the detection electrode 200 and the contact detection apparatus 300. When the user's finger touches the detection electrode 200, because a capacitance value $C\_{finger}$ between the finger and the ground also exists, in this case, the capacitance value between the detection electrode 200 and the system ground will be a sum of a capacitance value $C\_{ring}$ between the user's finger and the system ground and the capacitance value $C\_{ring}$ between the user's finger and the ground, that is $C\_{ring}+C\_{finger}$; the capacitance value between the user's finger and the ground is related to dryness of the user's finger, a contact force, and a coupling degree between the system ground and the ground, and the capacitance value should be between pF grade and nF grade.

Assuming that a charging current of the detection electrode 200 is equal to a discharging current of the detection electrode 200, and is recorded as $I\_{charge}$, a final voltage during charging is $V_{ref}$ and a counter clock frequency is $F\_{clk}$. When the user's finger does not touch the detection electrode 200, an output value $N\_{ring}$ of the analog to digital converter 310 should be $C\_{ring}*V_{ref}*F\_{clk}/I\_{charge}$. When the user's finger touches the detection electrode 200, the output value $N\_{ring}+N\_{finger}$ of the analog to digital converter 310 should be $(C\_{ring}+C\_{finger})*V_{ref}*F\_{clk}/I\_{charge}$. Therefore $N\_{finger}=C\_{finger}*V_{ref}*F\_{clk}/I\_{charge}$ is obtained, that is, by continuously detecting changes of the capacitance value of the detection electrode 200, it can be determined whether the user's finger touches the detection electrode 200, so as to determine whether the user's finger touches the fingerprint recognition apparatus 100.

Furthermore, because a contact detection apparatus 300 is integrated in a fingerprint recognition apparatus 100 in a portable electronic device (for example, a mobile phone, or a tablet computer), a switching power supply of the electronic device and a high-current switching related to radio frequency communication may cause electromagnetic interference (EMI). In particular, when the electronic device is in a charging state, a current switching of a charger can cause serious electromagnetic interference. Therefore, a system ground of the contact detection apparatus 300 can be caused to couple various frequencies of common-mode signals, that is, common-mode interference is generated. For example, when the user and the electronic device thereof are exposed to various electromagnetic environments, the user and the electronic device can be affected by the electromagnetic field, for example, suffering 50 Hz power frequency interference, in this case, the common-mode interference may occur.

When the user's finger touches the detection electrode 200, there is an electric potential difference between the system ground of the contact detection apparatus 300 and the ground. If the common-code interference exists, the electric potential difference between the system ground and the ground may fluctuate, and consequently, charge flow occurs between the detection electrode 200 and the user's finger; this affects a charging/discharging waveform of the detection electrode 200 detected by the contact detection apparatus 300. In other words, the common-code interference can cause changes of output values of the analog to digital converter 310.

Figure 4A:
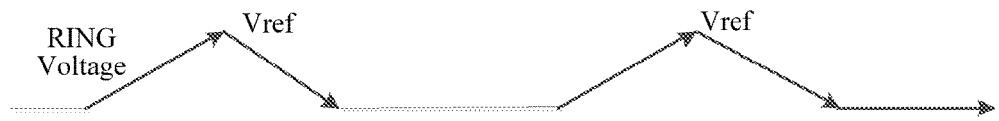
FIGS. 4A-4E are schematic diagrams of charging/discharging waveforms on a detection electrode 200 according to an embodiment of the present disclosure.
Figure 4B:
Figure 4C:
Figure 4D:
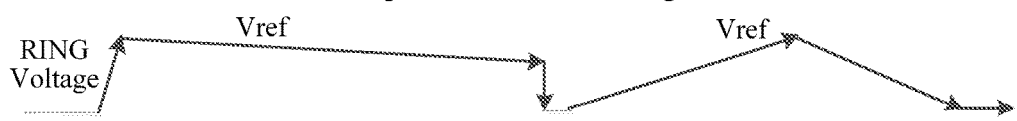
Figure 4E:

For example, FIGS. 4A-4E show charging/discharging waveforms of the detection electrode 200 with or without common-mode interference. As shown in FIG. 4A, when the user's finger does not touch the detection electrode 200, because the capacitance value of the detection electrode 200 is stable, in this case, the charging/discharging waveform of the detection electrode 200 is also very stable. As shown in FIG. 4B, when the user's finger touches the detection electrode 200 and in case that no common-mode interference exists, the capacitance value of the detection electrode 200 increases, and the charging/discharging current becomes smooth. As shown in FIGS. 4C to E, when the user's finger touches the detection electrode 200 and in case that the common-mode interference, the capacitance value of the detection electrode 200 can be various. FIG. 4C shows a case in which the capacitance value of the detection electrode 200 suffers sudden increase or sudden decrease. FIG. 4D shows a situation in which the charging speed is too fast, which is similar to the situation in which the capacitance value is too small. FIG. 4E shows a situation in which the charging speed is too slow, which is similar to the situation in which the capacitance value is too large.

Therefore, in an embodiment of the present disclosure, before the contact detection apparatus 300 charges and discharges the detection electrode 200, an internal switch can be switched on first to discharge the detection electrode 200 to the system ground by the user's finger, such that the common-mode interference and influence from residual charge on the user's finger are attenuated.

It should be understood that, when the user's finger touches the detection electrode 200, the electric potential difference between the system ground of the contact detection apparatus 300 and the ground is reflected on the charging/discharging waveform of the detection electrode 200. Therefore, abnormal change of the charging/discharging waveform of the detection electrode 200 under the common-mode interference may also be regarded as one of the effective signs for determining that the user's finger touches the detection electrode 200.

Figure 5:
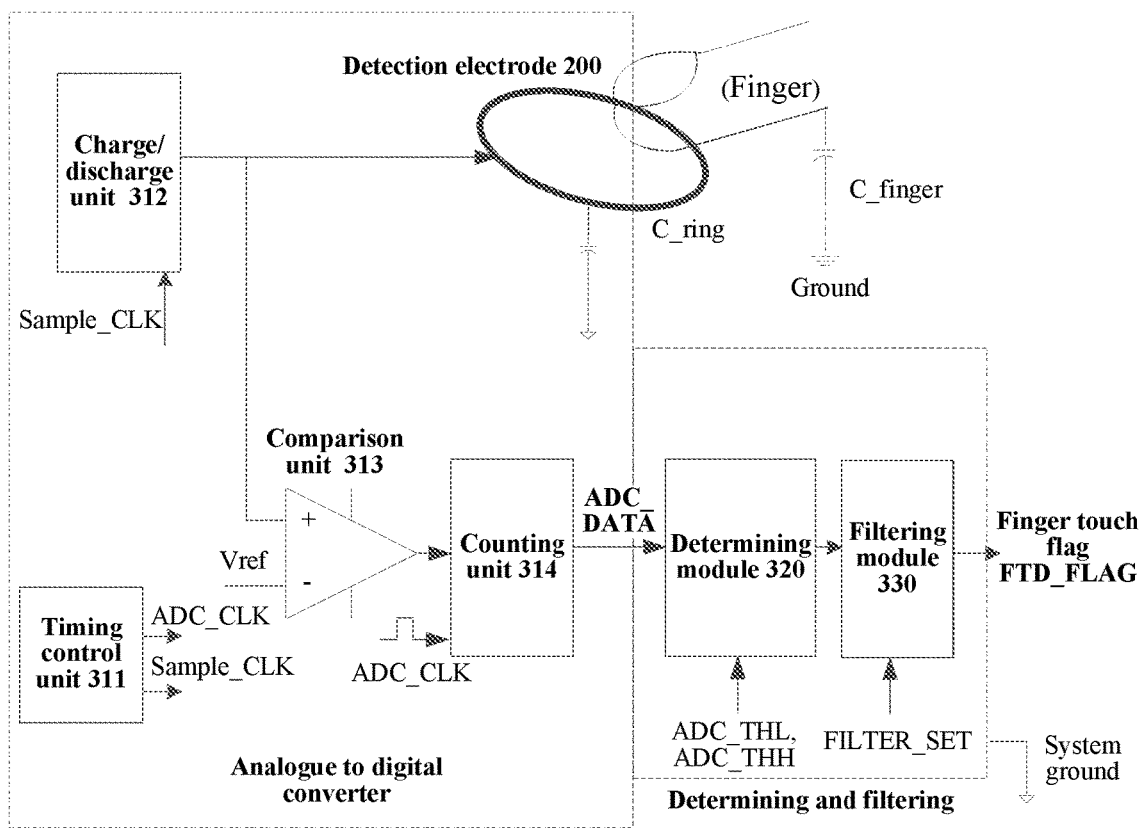
FIG. 5 is a schematic diagram of a fingerprint recognition system according to an embodiment of the present disclosure.

In an embodiment of the present disclosure, the analog to digital converter 310 includes a timing control unit 311, a charging/discharging unit 312, a comparison unit 313, and a counting unit 314. The timing control unit 311 is configured to generate a clock signal ADC_CLK and a sampling clock signal Sample_CLK as shown in FIG. 5.

The charging/discharging unit 312 is configured to charge and discharge the detection electrode 200 according to the sampling clock signal Sample_CLK.

The comparison unit 313 is configured to compare a voltage value V of the detection electrode 200 with a reference voltage value Vref during a charging and discharging process of the detection electrode 200 by the charging/discharging unit 312 according to the sampling clock signal Sample_CLK.

The counting unit 314 is configured to perform counting according to the clock signal ADC_CLK, and stop counting and output a count value ADC_DATA when the voltage value V of the detection electrode 200 reaches the reference voltage value Vref.

Figure 6:
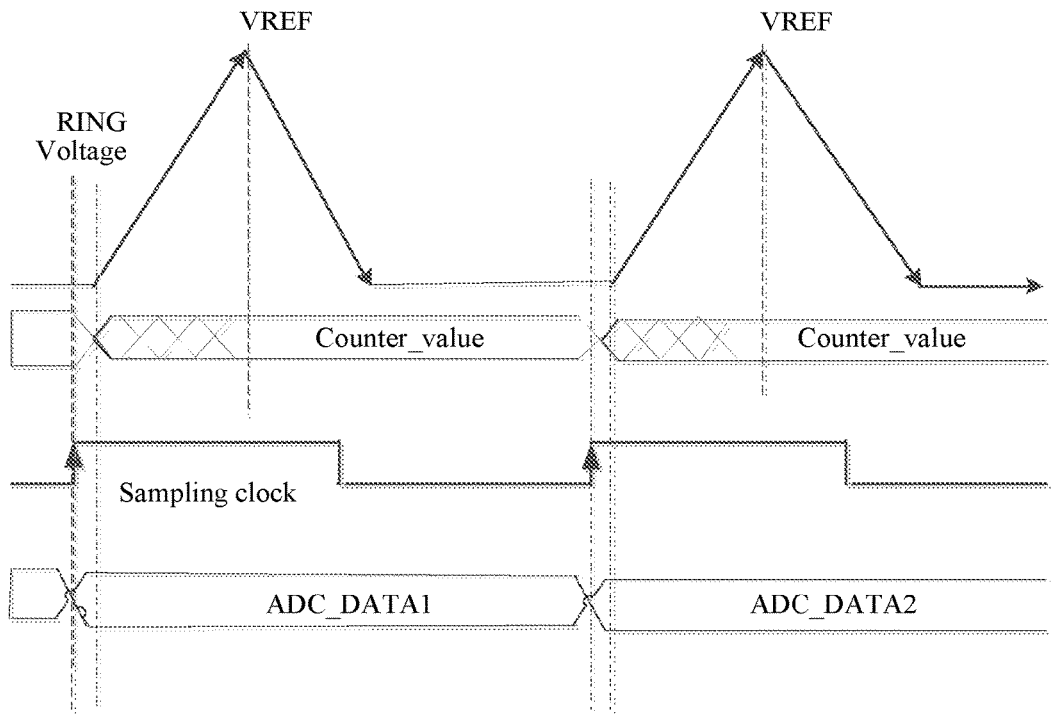
FIG. 6 is a schematic diagram of a waveform of a detection electrode 200 and a count value of a counting unit 314 according to an embodiment of the present disclosure.

Specifically, as shown in FIG. 5 and FIG. 6, the timing control unit 311 generates the sampling clock signal Sample_CLK. The charging/discharging unit 312 charges and discharges the detection electrode 200 within each sampling clock signal Sample_CLK. The timing control unit 311 scans changes of the voltage value V of the detection electrode 200, and inputs the voltage value V of the detection electrode 200 into the comparison unit 313. In particular, the timing control unit 311 inputs the voltage value V of the detection electrode 200 into a non-inverting input terminal of the comparison unit 313, and the reference voltage value $V_{ref}$ is input into an inverting input terminal of the comparison unit 313. The comparison unit 313 compares the voltage value V of the detection electrode 200 with the reference voltage value $V_{ref}$, and outputs a result of the comparison into the counting unit 314. The timing control unit 311 simultaneously generates the clock signal ADC_CLK. The counting unit 314 starts counting when the charging/discharging unit 312 charges the detection electrode 200. When the comparison unit 313 determines that the voltage value V of the detection electrode 200 reaches the voltage set value $V_{ref}$ by means of comparison, the counting unit 314 stops counting and outputs the count value ADC_DATA. In this case, the count value ADC_DATA output by the counting unit 314 may be used as the capacitance value of the detection electrode 200.

In an embodiment of the present disclosure, when reaching a full count value, the counting unit 314 stops counting and outputs the count value. That is, even when the voltage value V of the detection electrode 200 does not reach the reference voltage value Vref, the counting unit 314 stops counting and outputs the count value ADC_DATA as long as the counting unit 314 reaches the full count value.

In an embodiment of the present disclosure, the determining module 320 includes a first threshold comparison unit 321, a second threshold comparison unit 322, and a generation unit 323. The first threshold comparison unit 321 is configured to compare whether the count value is less than a first threshold. The second threshold comparison unit 322 is configured to compare whether the count value is greater than a second threshold, where the second threshold is greater than the first threshold. When the count value is less than the first threshold (which indicates that the capacitance value of the detection electrode 200 is too small), or the count value is greater than the second threshold (which indicates that the capacitance value of the detection electrode 200 is too large), the generation unit 323 determines that the user's finger touches the detection electrode 200, and generates the finger touch information.

Specifically, the determining module 320 may include two threshold comparison units. As shown in FIG. 3 and FIG. 5, the first threshold comparison unit 321 has a first threshold ADC_THL, and the second threshold comparison unit 322 has a second threshold ADC_THH; the second threshold ADC_THH is greater than the first threshold ADC_THL, and the first threshold ADC_THL and the second threshold ADC_THH may be adjusted according to a structure of a fingerprint detection apparatus. The first threshold comparison unit 321 and the second threshold comparison unit 322 compares the count value ADC_DATA output by the counting unit 314 with the first threshold and the second threshold respectively, so as to determine whether a common-mode interference exists, thereby determining whether the detection electrode 200 is touched by the finger.

After determining that the user's finger touches the detection electrode 200, the generation unit 323 generates the finger touch information, so as to control the fingerprint recognition apparatus 100 (not shown in the figure) to start performing collection and comparison for a user fingerprint by using the fingerprint scanning module, the feature extraction module, the encryption and transmission module, and the like.

Because whether the detection electrode 200 is touched by a finger only determined once, error determination may occur. In an embodiment of the present disclosure, the contact detection apparatus 300 further includes a filtering module 330. The filtering module 330 is configured to collect statistics for multiple pieces of the finger touch information generated by the determining module 320 within a preset period of time, and output a finger touch flag according to a preset rule, so as to start the fingerprint recognition apparatus 100 (not shown in the figure).

Specifically, within the preset period of time, after periodically determining that the user's finger touches the detection electrode 200 by the determining module 320, the filtering module 330 may further collect the statistical count values output by the counting unit 314, that is, perform glitch filtering and multiple accumulations according to the changes of the capacitance value. The filtering module 330 finally outputs the finger touch flag FTD_FLAG if the preset rule (for example, the determining module 320 determines that the detection electrode 200 is touched by the finger for five times, and the like) is satisfied.

It should be understood that, in the present disclosure, the whole fingerprint recognition system can be fabricated as a chip, and the fingerprint recognition system is configured as a system on chip.

The fingerprint recognition system provided in embodiments of the present disclosure determines whether the fingerprint recognition apparatus is touched by a finger according to the change of the capacitance value of the detection electrode, and activates the fingerprint recognition apparatus to perform fingerprint recognition when detecting that the fingerprint recognition apparatus is touched by the finger, while most of function modules of the fingerprint recognition apparatus are kept in a sleep state when no finger touch is detected on the fingerprint recognition apparatus. Accordingly, the fingerprint recognition system can reliably and effectively recognize a user's fingerprint while greatly reduce an overall power consumption of the fingerprint recognition apparatus. In addition, complex filtering of common-mode interference and computing requirements of a micro control unit MCU are reduced, so that a circuit structure of the fingerprint recognition system is simple, thereby reducing a manufacturing cost of the fingerprint recognition apparatus.

To implement the foregoing embodiments, the present disclosure further provides a fingerprint recognition method.

Figure 7:
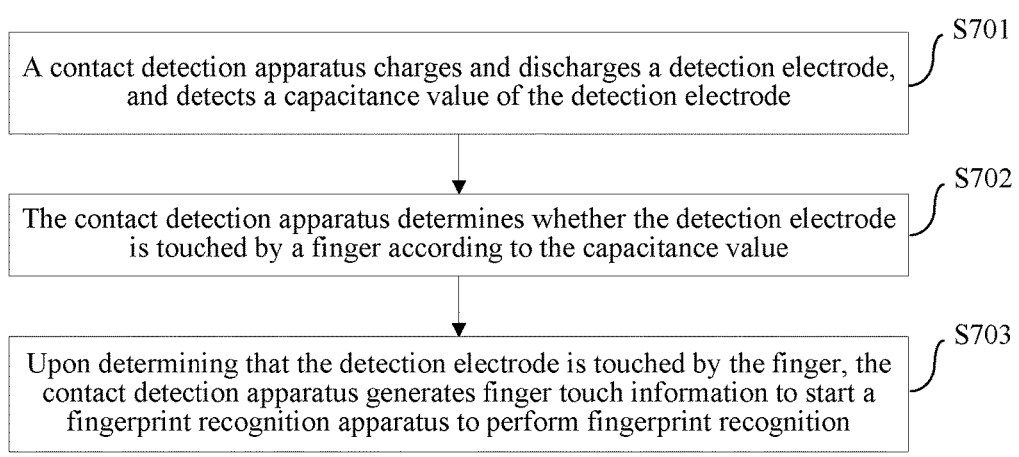
FIG. 7 is a flowchart of a fingerprint recognition method according to an embodiment of the present disclosure.

FIG. 7 is a flowchart of a detection method for detecting finger touch according to an embodiment of the present disclosure. As shown in FIG. 7, the detection method includes the following steps.

S701: A contact detection apparatus charges and discharges a detection electrode, and detects a capacitance value of the detection electrode.

In an embodiment of the present disclosure, the detection electrode includes a metal ring that is arranged on a surface of the fingerprint recognition apparatus, and the metal ring is shared with the fingerprint recognition apparatus 100 to carry a drive signal of the fingerprint recognition apparatus; or the detection electrode includes a metal layer that is disposed on a surface of the contact detection apparatus; or the detection electrode includes a detection film that is disposed on the contact detection apparatus and covered by a covering object.

In an embodiment of the present disclosure, the step that contact detection apparatus charges and discharges a detection electrode, and detects a capacitance value of the detection electrode specifically includes:

generating a clock signal and a sampling clock signal;
charging and discharging the detection electrode according to the sampling clock signal;
comparing a voltage value of the detection electrode with a reference voltage value during the charging and discharging process of the detection electrode; and
performing counting according to the clock signal, and when the voltage value of the detection electrode reaches the reference voltage value, stopping counting and outputting a counting value.

S702: The contact detection apparatus determines whether the detection electrode is touched by a finger according to the capacitance value.

In an embodiment of the present disclosure, the step that the contact detection apparatus determines whether the detection electrode is touched by a finger according to the capacitance value specifically includes:

comparing the counting value with a first threshold to determine whether the counting value is less than the first threshold;
comparing the counting value with a second threshold to determine whether the counting value is greater than the second threshold; and
determining that the finger touches the detection electrode when the counting value is less than the first threshold or is greater than the second threshold.

S703: upon determining that the detection electrode is touched by the finger, the contact detection apparatus generates finger touch information to activate a fingerprint recognition apparatus to perform fingerprint recognition.

In an embodiment of the present disclosure, after determining that the detection electrode is touched by the finger, the method further includes:

collecting statistics for multiple pieces of the finger touch information within preset period of time, and outputting a finger touch flag according to a preset rule, so as to activate the fingerprint recognition apparatus.

In an embodiment of the present disclosure, upon determining that the detection electrode is not touched by the finger, the fingerprint recognition apparatus remains in a sleep state.

In the fingerprint recognition method provided in this embodiment of the present disclosure, whether the fingerprint recognition apparatus is touched by a finger is determined according to a change of a capacitance value of the detection electrode, and the fingerprint recognition apparatus is activated to perform fingerprint recognition upon detecting that the fingerprint recognition apparatus is touched by the finger, while most of function modules of the fingerprint recognition apparatus are kept in a sleep state when no finger touch is detected on the fingerprint recognition apparatus. Accordingly, the fingerprint recognition system can reliably and effectively recognize a user's fingerprint while greatly reduce an overall power consumption of the fingerprint recognition apparatus.

It should be noted that, a specific implementation manner of the fingerprint recognition method in this embodiment of the present disclosure is similar to some specific implementation manners of the fingerprint recognition system in the embodiments of the present disclosure. Refer to description of the fingerprint recognition system for details. To reduce redundancy, the details are not described herein again.

It should be appreciated that, each part of the present disclosure may be implemented by using hardware, software, firmware or a combination thereof. In the foregoing implementation manners, multiple steps or methods may be stored in a memory and may be implemented by using the software or firmware that is executed by a suitable instruction execution system. For example, if it is implemented by using the hardware, it may be implemented by any one of the following technologies known in the art or a combination thereof as in another implementation manner: a discrete logic circuit having a logic gate circuit that is configured to implement logic functions of data signals, an application-specific integrated circuit having a suitable combined logic gate circuit, a programmable gate array (PGA), a field programmable gate array (FPGA), and the like.

In the present disclosure, unless otherwise clearly specified and limited, the terms such as "installation", "link" and "connection" should be understood broadly. For example, the "connection" may be fixed connection, may be removable connection, or may be integrated into one; may be mechanical connection, or may be electric connection; or may be direct connection, may be indirect connection by using an intermediate medium, may be communication inside two elements, or may be a relationship of interaction between two elements, unless otherwise clearly limited. A person of ordinary skill in the art may understand specific means of the foregoing terms in the present disclosure according to a specific case.

In description of this specification, description of the reference term such as "an embodiment", "some embodiments", "an example", "a specific example" or "some examples" means that a specific feature, a structure, a material or a characteristic that is described with reference to the embodiment or example is included in at least one embodiment or example of the present disclosure. In this specification, schematic description of the foregoing terms is unnecessarily for a same embodiment or example. Moreover, the described specific feature, structure, material or characteristic may be combined in any proper manner in any one or multiple embodiments or examples. In addition, a person skilled in the art may integrate and combine different embodiments or examples described in this specification or features thereof as long as no conflict occurs.

Although the above shows and describes the embodiments of the present disclosure, it may be understood that the foregoing embodiments are exemplary, cannot be construed as limitation to the present disclosure. A person of ordinary skill in the art may make variations, modification, replacement or deformation to the foregoing embodiments within the scope of the present disclosure.

What is claimed is:

1. A fingerprint recognition system, comprising:
a fingerprint recognition apparatus;
a detection electrode; and
a contact detection apparatus, wherein the contact detection apparatus comprises:
an analog to digital converter configured to charge and discharge the detection electrode, and detect a capacitance value of the detection electrode;
wherein the analog to digital converter comprises:
a timing control unit configured to generate a clock signal and a sampling clock signal;
a charging/discharging unit configured to charge and discharge the detection electrode according to the sampling clock signal;
a comparison unit configured to compare a voltage value of the detection electrode with a voltage set value in a process of charging and discharging the detection electrode by the charging/discharging unit, and
a counting unit configured to perform counting according to the clock signal, and stop counting, and output a count value when the voltage value of the detection electrode reaches the voltage set value;
and
a determining module comprising:
a first threshold comparison unit configured to compare whether the count value is less than a first threshold;
a second threshold comparison unit configured to compare whether the count value is greater than a second threshold, wherein the second threshold is greater than the first threshold; and
a generation unit configured to determine that the detection electrode is touched by the finger and to generate the finger touch information when the count value is less than the first threshold or the count value is greater than the second threshold.

2. The fingerprint recognition system according to claim 1, wherein the contact detection apparatus further comprises:
a filtering module configured to collect statistics for multiple pieces of the finger touch information within a preset period of time and to output a finger touch flag according to a preset rule to start the fingerprint recognition apparatus.

3. The fingerprint recognition system according to claim 2, wherein the detection electrode comprises:
a metal ring disposed on a surface of the fingerprint recognition apparatus, wherein the metal ring is shared with the fingerprint recognition apparatus to carry a drive signal of the fingerprint recognition apparatus; or,
a metal layer disposed on a surface of the contact detection apparatus; or
a detection film disposed on the contact detection apparatus, wherein the detection film is under a covering.

4. The fingerprint recognition system according to claim 1, wherein when it is determined that the finger does not touch the detection electrode, the fingerprint recognition apparatus remains in a sleep state.

5. A fingerprint recognition method, comprising:
charging and discharging, by a contact detection apparatus, a detection electrode, and detecting a capacitance value of the detection electrode;
wherein the charging and discharging, by a contact detection apparatus, a detection electrode, and detecting a capacitance value of the detection electrode comprises:

generating a clock signal and a sampling clock signal;
charging and discharging the detection electrode according to the sampling clock signal;
comparing a voltage value of the detection electrode with a voltage set value in a process of charging and discharging the detection electrode; and
performing counting according to the clock signal, and stopping counting and outputting a counting value when the voltage value of the detection electrode reaches the voltage set value;
determining, by the contact detection apparatus, whether the detection electrode is touched by a finger according to the counting value; and
generating, by the contact detection apparatus, finger touch information to activate a fingerprint recognition apparatus to perform fingerprint recognition upon determining that the detection electrode is touched by a finger;
wherein the determining, by the contact detection apparatus, whether the detection electrode is touched by a finger according to the capacitance value comprises:
comparing the counting value with a first threshold to determine whether the counting value is less than a first threshold;
comparing the counting value with a second threshold to determine whether the counting value is greater than a second threshold, wherein the second threshold is greater than the first threshold; and
determining that the finger touches the detection electrode, and generating the finger touch information when the counting value is less than the first threshold or the counting value is greater than the second threshold.

6. The fingerprint recognition method according to claim 5, wherein after the generating the finger touch information, the method further comprises:
collecting statistics for multiple pieces of the finger touch information within a preset period of time and outputting a finger touch flag according to a preset rule to activate the fingerprint recognition apparatus.

7. The fingerprint recognition method according to claim 6, wherein the detection electrode comprises a metal ring disposed on a surface of the fingerprint recognition apparatus, wherein the metal ring is shared by a drive signal of the fingerprint recognition apparatus; or, a metal layer disposed on a surface of the contact detection apparatus; or, a detection film disposed on the contact detection apparatus, wherein the detection film is under a covering.

8. The fingerprint recognition method according to claim 5, wherein when it is determined that the detection electrode is not touched by the finger, the fingerprint recognition apparatus remains in a sleep state.

9. A device, comprising:
one or more processors;
a memory; and
one or more programs, wherein the one or more programs are stored in the memory, and when the one or more programs are executed by the one or more processors, a fingerprint recognition method is performed;
wherein the fingerprint recognition method comprises:
charging and discharging, by a contact detection apparatus, a detection electrode, and detecting a capacitance value of the detection electrode;
wherein the charging and discharging, by a contact detection apparatus, a detection electrode, and detecting a capacitance value of the detection electrode comprises:
generating a clock signal and a sampling clock signal;
charging and discharging the detection electrode according to the sampling clock signal;
comparing a voltage value of the detection electrode with a voltage set value in a process of charging and discharging the detection electrode; and
performing counting according to the clock signal, and stopping counting and outputting a counting value when the voltage value of the detection electrode reaches the voltage set value;
determining, by the contact detection apparatus, whether the detection electrode is touched by a finger according to the counting value; and
generating, by the contact detection apparatus, finger touch information to activate a fingerprint recognition apparatus to perform fingerprint recognition upon determining that the detection electrode is touched by a finger;
wherein the determining, by the contact detection apparatus, whether the detection electrode is touched by a finger according to the capacitance value comprises:
comparing the counting value with a first threshold to determine whether the counting value is less than a first threshold;
comparing the counting value with a second threshold to determine whether the counting value is greater than a second threshold, wherein the second threshold is greater than the first threshold; and
determining that the finger touches the detection electrode, and generating the finger touch information when the counting value is less than the first threshold or the counting value is greater than the second threshold.

10. The device according to claim 9, wherein after the generating the finger touch information, the method further comprises:
collecting statistics for multiple pieces of the finger touch information within a preset period of time and outputting a finger touch flag according to a preset rule to activate the fingerprint recognition apparatus.

11. The device according to claim 9, wherein the detection electrode comprises a metal ring disposed on a surface of the fingerprint recognition apparatus, wherein the metal ring is shared by a drive signal of the fingerprint recognition apparatus; or, a metal layer disposed on a surface of the contact detection apparatus; or, a detection film disposed on the contact detection apparatus, wherein the detection film is under a covering.

12. The device according to claim 9, wherein when it is determined that the detection electrode is not touched by the finger, the fingerprint recognition apparatus remains in a sleep state.

* * * * *